US006072631A

United States Patent [19]
Guenther et al.

[11] Patent Number: 6,072,631
[45] Date of Patent: Jun. 6, 2000

[54] DIFFRACTIVE HOMOGENIZER WITH COMPENSATION FOR SPATIAL COHERENCE

[75] Inventors: Reid L. Guenther, Austin; Curtis L. Shoemaker, Round Rock, both of Tex.

[73] Assignee: 3M Innovative Properties Company, St. Paul, Minn.

[21] Appl. No.: 09/112,664

[22] Filed: Jul. 9, 1998

[51] Int. Cl.[7] .................................................... G02B 5/18
[52] U.S. Cl. .......................... 359/569; 359/575; 359/565
[58] Field of Search ..................................... 359/569, 575, 359/565, 15, 566

[56] References Cited

U.S. PATENT DOCUMENTS

| | | | |
|---|---|---|---|
| 4,475,027 | 10/1984 | Pressley | 219/121 L |
| 4,516,832 | 5/1985 | Jain et al. | 350/96.24 |
| 4,547,037 | 10/1985 | Case | 350/3.75 |
| 4,733,944 | 3/1988 | Fahlen et al. | 350/167 |
| 5,414,559 | 5/1995 | Burghardt et al. | 359/623 |
| 5,486,950 | 1/1996 | Collinge | 359/565 |
| 5,503,959 | 4/1996 | Langston | 430/312 |
| 5,610,733 | 3/1997 | Feldman et al. | 359/9 |
| 5,631,721 | 5/1997 | Stanton et al. | 355/71 |

FOREIGN PATENT DOCUMENTS

| | | |
|---|---|---|
| 2 716 726 | 2/1995 | France . |
| 2278458 | 11/1994 | United Kingdom . |
| WO 98/28650 | 2/1998 | WIPO .............................. G02B 27/09 |

OTHER PUBLICATIONS

E. Wolf, "A Macroscopic Theory of Interference and Diffraction of Light form Finite Sources," pp. 178–193 (Reprinted from *Proceedings of the Royal Society*, Ser. A, vol. 225, pp. 96–111 (1954).

W.H. Press et al., 1988, Numerical Recipes in C, Chapter 10.9, "Combinatorial minimization: Method of Simulated Annealing," New York: Cambridge University Press (1988).

(List continued on next page.)

*Primary Examiner*—Cassandra Spyrou
*Assistant Examiner*—Fayez Assaf
*Attorney, Agent, or Firm*—Darla P. Fonseca

[57] ABSTRACT

A diffractive homogenizer is provided for receiving a beam of laser energy and producing a desired illumination pattern in a target plane. The homogenizer is made up of a plurality of diffractive sub-elements, each of which contributes to all or a portion of the desired image. By combining the contributions of many sub-elements to form the final image, a homogenizing effect is realized. In preferred embodiments, the sub-elements are designed to compensate for the finite spatial coherence of the incident laser beam and to control the numerical aperture distribution of the transmitted light. Each sub-element is composed of a large number of discrete pixels, each of which alters the phase of radiation passing therethrough by a selected amount. The pixel arrangement is chosen, using computer modeling and optimization techniques, such that the interference pattern created by the collective pixels in a sub-element makes up the desired image (or a portion thereof). A technique is also provided for reducing the intensity of the image formed by a selected sub-element, which may be located in a laser "hot spot", by randomizing a selected percentage of the pixels located in that sub-element. This diffractive homogenizer is useful in various laser ablation and annealing and other laser material processing applications.

22 Claims, 7 Drawing Sheets

OTHER PUBLICATIONS

Johnson, et al., "Advantages of Generic Algorithm Optimization Methods in Diffractive Optic Design," Diffractive and Miniaturized Optics, Critical Reviews of Optical Science and Technology, vol. CR49, pp. 54–74 (Jul. 12–13, 1993).

Dresel, et al., "Design of Computer–Generated Beam–Shaping Holograms by Iterative Finite–Element Mesh Adaption," Applied Optics, vol. 35, No. 35 (Dec. 10, 1996).

Nikolajeff et al., "Diffractive Microlenses Replicated In Fused Silica for Excimer Laser–Beam Homogenzing," Applied Optics, vol. 36, No. 32, pp. 8481–8489 (Nov. 10, 1997).

Feldman, M.R. et al, "Iterative encoding of high–efficiency holograms for generation of spot arrays", *Optics Letters*, vol. 14, No. 10, May 15, 1989, pp. 479–481.

Duparré, M. et al, "Investigation of computer–generated diffractive beam shapers for flattening of single–modal $CO_2$ laser beams", *Applied Optics*, vol. 34, No. 14, May 10, 1995, pp. 2489–2497.

Brigham, E.O., *The Fast Fourier Transform*, 1974, Prentice–Hall, Englewood Cliffs, pp. 50–61.

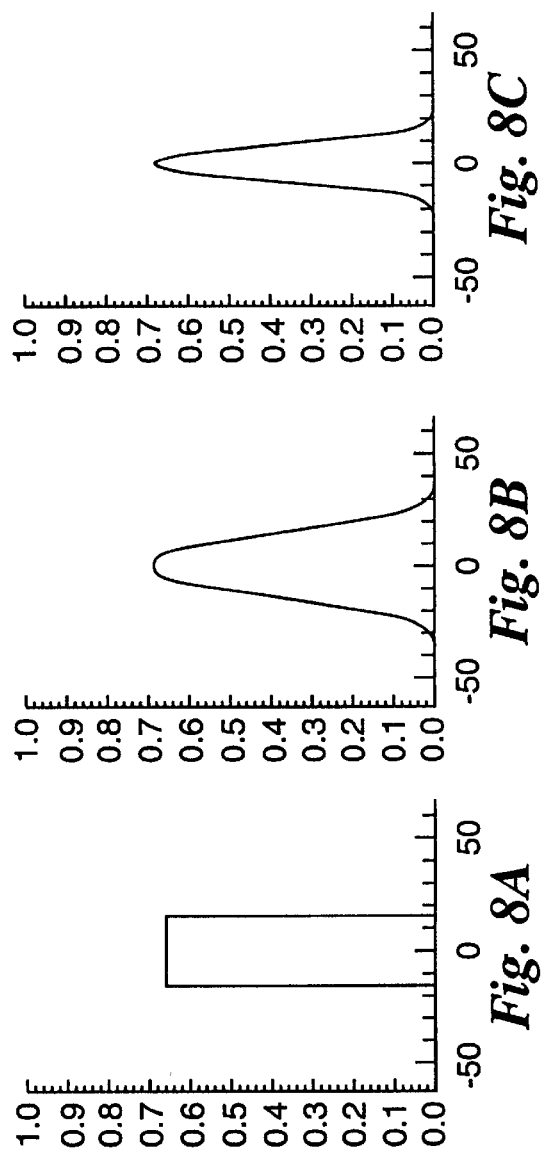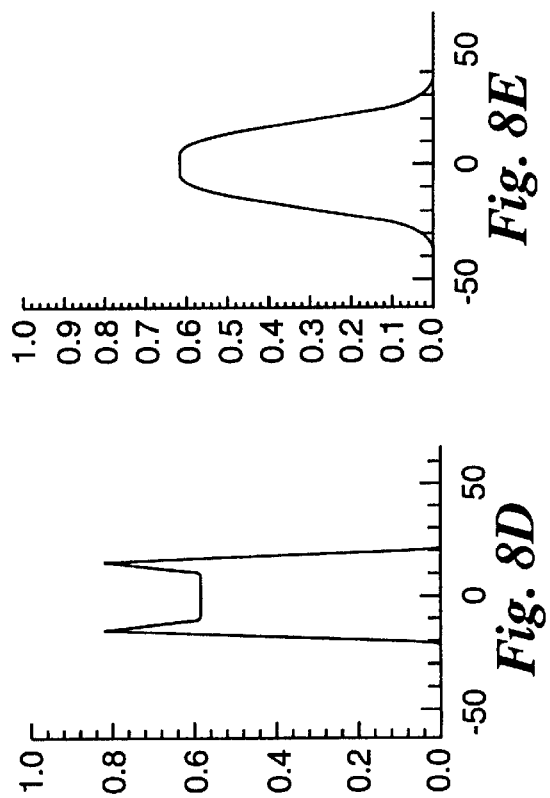

DIFFRACTIVE HOMOGENIZER WITH COMPENSATION FOR SPATIAL COHERENCE

BACKGROUND

1. Field of the Invention

The present invention relates to the field of homogenizing and shaping a beam of light, such as laser light, using a diffractive optical element. In particular, the invention provides a method for designing a pattern of diffracting and phase-shifting elements that form a selected image when illuminated with a laser. The invention further provides an efficient method for compensating for the partial spatial coherence of a laser beam in the pattern design.

2. Discussion of the Prior Art

Lasers have been applied to many materials processing operations, including ablation of plastic films, welding and soldering of metals, cutting and marking of both metals and non-metals and annealing of materials including semiconductors. The latter application includes liquid and solid phase epitaxy, crystalinity growth, activation and diffusion of dopants, and elimination of lattice defects. The alternative to laser annealing of semiconductors, furnace annealing, requires heating semiconductors at temperatures between 500 degrees and 1000 degrees for prolonged periods, which is neither convenient nor as effective as laser annealing.

Ultraviolet (UV) excimer lasers have recently been applied as semiconductor processing tools. Typical applications have included semiconductor annealing, microphotolithography, photodeposition, laser-induced chemical vapor deposition (CVD), gas immersion laser doping (GILDing), micromachining, and several other processes. In nearly all of these applications, laser output beam intensity profile uniformity is of paramount importance. Hereafter, the term "beam uniformity" will be employed to refer to beam intensity profile uniformity. Present discharge UV excimer laser technology does not produce laser output beams having adequate uniformity while maintaining required laser output energy.

Available commercial UV excimer lasers do not maintain an adequate level of uniformity over the beam area to ensure sufficient uniform energy density. Further complicating this problem is the presence of occasional and essentially unpredictable changes in laser output beam uniformity on a shot-to-shot basis. Also, as feature sizes (such as semiconductor structures and tolerances) become smaller, the requirements for laser output beam uniformity become more severe.

Optical integrators have been used to homogenize a beam in various types of illumination systems. In most optical integrators, the homogenization of the input beam occurs in one of two ways. Optical integration techniques typically involve either some kind of randomization of the laser output beam (in phase or amplitude) or separation and overlapping of numerous beam segments. The input beam can either be scrambled by a diffuser (a set of lenses with partially overlapping outputs, random phase shift masks, or echelons) or by multiple scatterings in a tube much like a kaleidoscope. Alternatively, the input beam can be broken apart into segments and these segments then imaged on top of one another to average out fluctuations in beam intensity.

Laser beams often do not have a uniform distribution of intensity throughout their cross-section. This is true of most laser sources. The intensity distribution of many laser beams is described, for instance, by a bell shaped curve (Gaussian profile) which is rotationally symmetrical to the direction and spread of the beam. In the case of the so-called unstable resonators, the intensity of the laser beam is sometimes characterized by a hole in the middle of the beam cross-section. Beam profile variations may also be due to anode to cathode variations in an excimer laser. Intensity peaks, so-called "hot spots", frequently occur both with pulsed and continuous laser sources. These are limited areas in the beam cross-section where the intensity of the laser beam is much greater than in the remainder of the area. Such hot spots can appear either at certain locations or they may move within the cross-section of the beam.

This irregular distribution of the beam intensity throughout the beam cross-section and solid angle is disadvantageous for a variety of applications of laser beams. The irregular intensity distributions or intensity peaks and inhomogeneous or unsymetrical angular energy distributions can degrade laser processing, for instance, when pieces of a large area are to be ablated or processed using laser beams.

In many applications, not only must the irregular laser intensity profile be smoothed out before a useful beam can be provided, but the beam must be spread and shaped into a preselected distribution providing equal (or predetermined) intensity throughout the beam distribution area. For example, it may be desirable to use laser ablation to form perforations in a sheet of plastic film. It is desirable to be able to form hundreds of high precision holes, vias or perforations in a given area at one time, using a beam of laser energy that passes through a mask defining the locations of the perforations. In order to obtain the required precision and uniformity of feature sizes on the final product, a substantially equal amount of laser energy must be applied through each hole in the mask. To accomplish this, a highly uniform laser beam must be applied to the areas of the mask where the holes are located. It is simultaneously desirable to conserve energy by applying the laser energy only to the portions of the mask where the holes are located. In a presently preferred embodiment, such holes are located along a pair of long narrow strips of area (as shown in FIG. 1). It is therefore desirable to direct or focus the laser energy into a pair of long narrow beams, each having a highly uniform intensity profile throughout the length and breadth of the illuminated field.

U.S. Pat. Nos. 4,733,944 and 5,414,559 disclose refractive optical devices for homogenizing a light beam. These systems use refractive elements to generate homogenized images having selected sizes and aspect ratios. U.S. Pat. No. 4,733,944 discloses an apparatus for producing a rectangular homogenized beam suitable for use in semiconductor processing. The method disclosed in that patent does not, however, provide a technique for forming an homogenized image having an arbitrary size and shape, as is required by many current applications. Furthermore, the finite spatial coherence (or non-zero beam divergence) of the incident beam contributes to blurring in all homogenizers, which is not compensated for in most prior art technologies including those described herein.

U.S. Pat. No. 5,414,559 provides a refractive arrangement for generating spatially separate homogenized illumination fields from a laser beam. The approach illustrated in that patent requires an arrangement of complex refractive optical elements that must be specially designed to provide the illumination field pattern that is desired. This device is directed to the same problem as the present invention, that is to form two elongated images or illuminated fields having a uniform intensity distribution, but it is expensive and cannot be extended to more general illumination field patterns. Furthermore, it does not lend itself to correction for finite spatial coherence or modification for numerical aperture distribution.

U.K. Patent Application GB 2,278,458 discloses a laser beam homogenization device that comprises a phase zone plate array having a random two-dimensional array of close-packed diffracting Fresnel-type zone plates. This device, when used in conjunction with a principal focusing lens, is used to give a laser beam having a non-uniform intensity profile a more uniform intensity profile before directing it to a workpiece. This device does not effect the shape or size of the image created by the laser beam on the workpiece.

U.S. Pat. No. 4,475,027 discloses an optical beam homogenizer that divides and redirects a beam to provide uniform irradiation to a plane surface, using a reflective arrangement of segmented mirrors. This patent also discloses a refractive beam homogenizer, as illustrated in FIG. 5 of the '027 patent. Both of the reflective and refractive techniques disclosed in the '027 patent provide only a square or rectangular image. This approach does not provide the ability to form the illumination field into an arbitrary preselected shape, as is required in many applications.

The use of computer generated holograms for beam shaping is described in "Design of computer-generated beam-shaping holograms by iterative finite-element mesh adaption", T. Dresel, et al, *Applied Optics* 35:35, p. 6865–74, Dec. 10, 1996. This reference describes a numerical approach based on intuitive finite-element mesh adaptation that permits the design of appropriate phase functions for the task of focusing a laser beam into two-dimensional reconstruction patterns. Both the hologram aperture and the reconstruction pattern are covered by mesh mappings, and an intuitive procedure designs meshes with intensities equally distributed over the constituting elements.

It should be noted that performance of all homogenizers based on overlap of beam segments, including the prior art described above, in terms of uniformity of the resultant illumination field, is directly dependent of input beam symmetry, alignment of the beam with respect to the entrance aperture of the homogenizer, and laser pointing stability. If a perfectly symmetric beam is used, but misaligned relative to the homogenizer, then the resulting illumination field will not be completely uniform. Likewise, if an asymmetric beam intensity distribution is applied to the homogenizer, then the illumination field will also not be completely uniform. Any continuous mathematical function, including a laser beam intensity distribution, can be reduced to a sum of a symmetric and an anti-symmetric contributions. The symmetric portion (with respect to the center of the homogenizer entrance aperture) will generate a perfectly uniform output beam as a result of the incoherent superposition of its constituent beamlets. The anti-symmetric portion, usually much smaller in overall magnitude, will contribute to the lack of uniformity of the output beam. The greater the number of homogenizer elements, the smaller the overall variation of the anti-symmetric contribution.

Laser processing systems can also show variations in the uniformity of the ablated results, even if homogenizer performance and laser beam properties are ideal. For systems that are designed to be symmetric about the optical axis of the system (i.e., comprised of spherical optics, cylindrical optics, and aspheres symmetric about the optic axis), experience has shown that the variation in ablation results across the field of view of the imaging lens may take the shape of a "smile" or a "frown." For instance, if a long row of holes is drilled across the field of view of the imaging lens, the hole in the center may be largest (or smallest) with a symmetrical variation across the workpiece. This variation can be due to chromatic aberrations in the imaging lens, aging effects of the various optics, etc. Variations in a system that is not well aligned, or that has a rather non-ideal laser beam on its input, need not have this characteristic "smile" or "frown" variation, but it is the experience of the inventors that this is the most commonly occurring variation in a well behaved system. Homogenizers in the prior art, as described above, lack the flexibility of providing a "process correction" by changing the illumination field intensity to compensate for these effects.

The prior art described above does not provide an economical, efficient and flexible method for homogenizing a laser beam and providing an arbitrary selected illumination pattern, while providing compensation for the non-ideal nature of the beam. It is desirable to provide a homogenizing optical element that compensates for irregularities in a beam, including its lack of symmetry and partially spatially coherent nature, and to provide a method for designing and manufacturing such an element.

SUMMARY OF THE INVENTION

The invention is a binary or multi-level diffractive homogenizer that receives a non-homogeneous incident beam of laser energy and that transmits in response thereto a plurality of individual beams to form a selected image having a relatively uniform intensity profile, and method of designing such a homogenizer. In preferred embodiments of the invention, the homogenizer may include compensation for the partial spatial coherence of the incident laser beam, and it may be designed to adjust the numerical aperture distribution of the projected beam in order to improve an ablation or other laser process. Furthermore, it may provide a custom tailored intensity distribution to compensate a laser process for other process variables provided their variation is understood and repeatable.

According to the present invention, the diffractive homogenizer comprises a plurality of sub-elements, each of which receives a portion of a non-homogeneous incident laser beam and transmits in response thereto a beam to form a selected image. The images formed by a plurality of such sub-elements combine additively to form the homogenized final image. The sub-elements are spaced across the breadth of the incident beam, so that any "hot spots" or other irregularities in the beam are spread out over the breadth of the image that is formed. Such an arrangement of sub-elements also operates to flatten the normally curved intensity profile of the incident beam.

Each sub-element comprises a plurality of pixels, each pixel being a discrete phase-shifting area of the element. The image that is formed by each sub-element is the interference pattern created by the plurality of pixels in that sub-element. The optimal arrangement of pixels in each sub-element is determined using an optimization method such as simulated annealing or a genetic algorithm, implemented as a computer model.

In one aspect, the invention provides a diffractive homogenizer having a plurality of sub-elements, such sub-elements being responsive to an incident laser beam to form a selected image having a selected intensity distribution in a target plane. The image shape may be arbitrarily selected within the physical limits imposed by the diffraction of light. The intensity distribution can be arbitrarily controlled with the practical limits imposed by effects of non-perfect optical alignment, laser pointing stability, and the like. However, such control dramatically exceeds that available through the use of conventional homogenizing optics. Each sub-element comprises an array of "pixels", and each pixel provides a selected phase-shift to the light that passes therethrough. The image that is formed is the interference pattern that is formed by the pixel array. The design of the pixel array in each sub-element may be modified to account for the finite spatial coherence of the incident laser beam, thus producing an image having a more uniform intensity distribution than would otherwise be obtained, particularly when producing narrow or small uniformly illuminated patterns.

Note that, as used in this patent disclosure and claims, the term "partial coherence" (and variants thereof) refers to the finite spatial coherence or non-zero beam divergence over the area of the beam. The partial coherence of an incident laser beam, in the intended sense, may be quantified using a two-slit experiment, as is discussed below in connection with FIG. 5B, or with a shearing interferometer. These terms are used interchangeably in this patent.

In another aspect, the invention provides a method of designing a diffractive homogenizer, where the diffractive homogenizer comprises an array of sub-elements, each sub-element comprising an array of phase shifting pixels. The pixel array is selected to produce an interference pattern corresponding to the selected image to be produced by the diffractive homogenizer (or a portion of that image). The pixel array may be designed using an inverse modeling technique, wherein an initial random pixel pattern is manipulated to provide the desired image, using, for example, a simulated annealing approach to optimize the pixel pattern. The contributions of all of the sub-elements to the image combine to provide a homogenized image having a uniform (or other pre-selected) intensity profile.

In yet another aspect, the invention provides a method for designing a diffractive homogenizer that efficiently compensates for the spatial coherence of the laser light that is used in industrial applications. It is not practical to take the spatial coherence of the light into account directly while designing a pixel pattern according to this invention—to do so would increase the time required to generate a pixel pattern by several orders of magnitude. (The difference was six orders of magnitude in an exemplary case known to the inventors.) Therefore, the design method for generating a pixel pattern must assume fully coherent light. The limited spatial coherence of the light may be taken into consideration by modifying the desired image intensity profile that is used to create the pixel pattern. This modification is performed by determining the convolution function that accounts for the difference between an image formed using coherent light and an image formed using real light having limited spatial coherence. That convolution function is then applied inversely to the original desired image to create a "modified desired image." The modified desired image is then applied as an input to the pixel pattern generator. The image formed by passing partially coherent light through the resulting diffractive element approximates the original desired image much more closely than if the spatial coherence compensation was not applied.

DESCRIPTION OF THE DRAWINGS

So that the manner in which the herein described advantages and features of the present invention, as well as others which will become apparent, are attained and can be understood in detail, more particular description of the invention summarized above may be had by reference to the embodiments of the invention which are illustrated in the appended drawings, which drawings form a part of this specification.

It is noted, however, that the appended drawings illustrate only exemplary embodiments of the invention and are, therefore, not to be considered limiting of its scope, for the invention may admit to other equally effective embodiments.

FIGS. 8A through 8E illustrate the compensation method used to account for the effects of light having limited spatial coherence.

DETAILED DESCRIPTION OF PREFERRED EMBODIMENTS

Figure 2A:
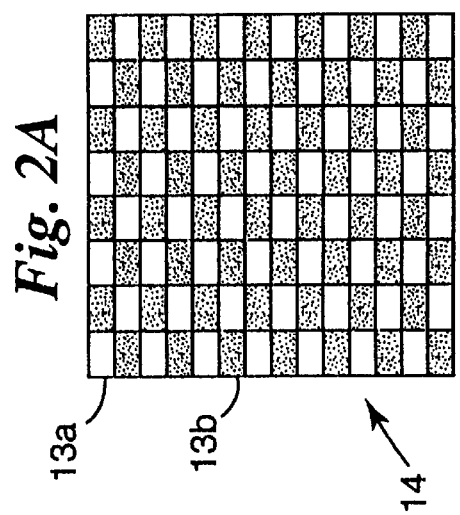
FIG. 2A illustrates a diffractive homogenizer having a plurality of diffractive sub-elements forming a "checkerboard" pattern.
Figure 2B:
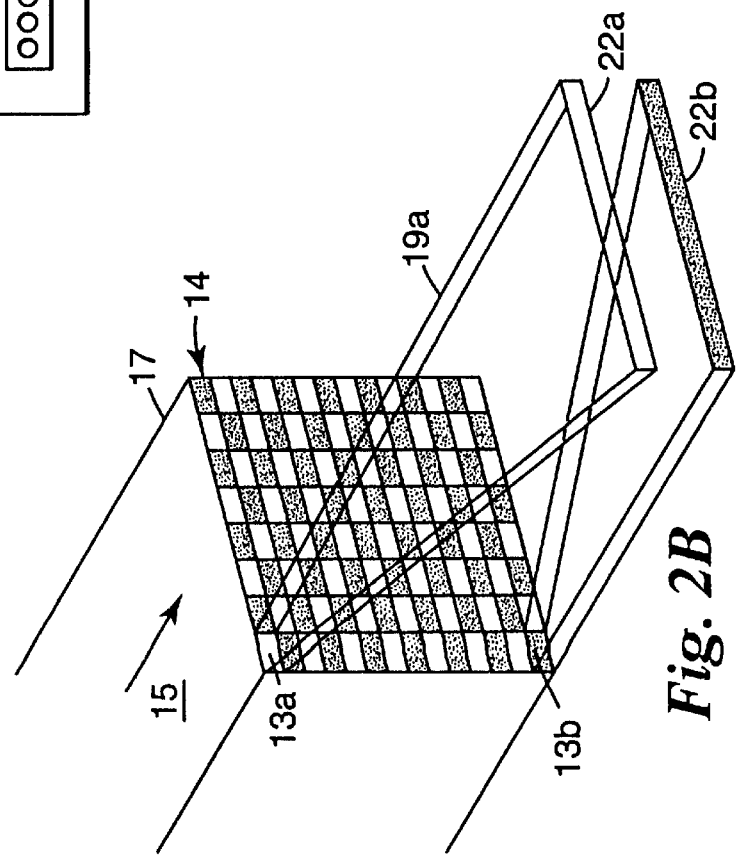
FIG. 2B is an isometric view showing the formation of an image by each sub-element of the diffractive homogenizer.

Referring to FIG. 2B, in preferred embodiments of the present invention diffractive element 14 is provided that receives a non-homogeneous beam of laser light 15 having limited spatial coherence and that forms an illuminated field 22 or image having a preselected size and shape and having a uniform light energy distribution over the area of the field, which is located in a target plane. The element 14 is typically made of a plate of fused silica or glass that is etched to form a pixel pattern thereon in a manner to be described below. The diffractive element 14 may be divided into a plurality of sub-elements, such as 13*a* and 13*b*, shown in FIG. 2A.

Figure 1:
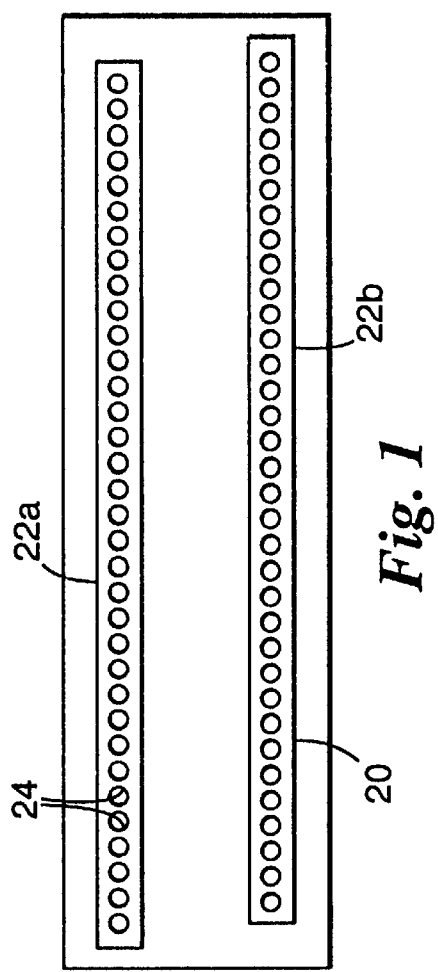
FIG. 1 is a plan view of projection mask having a pattern of holes perforated therein for permitting laser light to form a selected pattern after passing through the holes. The elongated illuminated images are also shown in this Figure.

In an exemplary preferred embodiment that will be described in detail in this specification, the desired image is a pair of long, narrow parallel illuminated areas 22*a*, 22*b*, which may be slightly offset from one another in the longitudinal direction, as shown in FIG. 1. Images having other sizes and shapes may also be formed using this invention. This image is provided as an example of one use of the invention claimed herein. In this illustrative embodiment, illuminated areas 22a and 22b are shown in FIG. 1 as they impinge upon mask 20, which is a generally opaque structure that includes a plurality of holes 24 through which the incident light can pass to reach the workpiece such as thin film transistor.

The diffractive element may comprise a plurality of sub-elements 13a or 13b, each sub-element forming a relatively uniform beam covering the selected image area from the incident light that impinges upon that sub-element from laser 10, so as to homogenize the light that reaches the workpiece by combining light from various parts of the original beam to create the selected image.

Due to the non-homogeneous nature of the incident laser light, the light that impinges on each sub element may be different in intensity from that which impinges on other sub-elements. It is the use of a plurality of sub-elements that provides the homogenization of the beam, because each of the sub-elements produces an intensity distribution that combines in additive incoherent superposition with the images formed by the other sub-elements. In the illustrated arrangement, the sub-elements are arranged in a "checkerboard" pattern, as shown in FIG. 2A. Each of the "white" sub-elements 13a forms image 22a, and each of the "black" sub-elements 13b forms image 22b. If there are relatively bright and dim regions in a cross section of the incident laser beam 15 (and there usually are), the diffractive element 14 of FIG. 2A operates to spread the effect of each discontinuity over the entire image area, thus providing an image having substantially uniform intensity over its entire area. Having a large number of sub-elements further enhances the uniformity of the overall image because the uncorrelated variations in the images produced by each sub-element tend to disappear as the images from numerous sub-elements are overlaid on one another.

Where it is desirable to concurrently form two spatially separate images from a single incident laser beam, one-half of the sub-elements can be used to form each image, as is shown in FIG. 2B. Alternatively, each sub-element may be designed to form the entire image.

In preferred embodiments of this invention each sub-element is comprised of a rectilinear grid of "pixels". A pixel, in this application, is a discrete area of the sub-element that has been etched to a selected thickness. In one presently preferred embodiment, each image is created by a 9 by 9 array of 81 sub-elements. The embodiment illustrated in FIGS. 2A and 2B has a 7 by 7 array of sub-elements forming each image. Sub-elements 13a that form image 22a are interspersed with sub-elements 13b that form image 22b, such that there are actually 98 sub-elements, 13 in the illustrated diffractive element 14. In a preferred embodiment, each sub-element is, for example, 2.8 by 1.4 mm and contains 980,000 pixels, each pixel being a square area 2 microns on a side.

Figure 3:
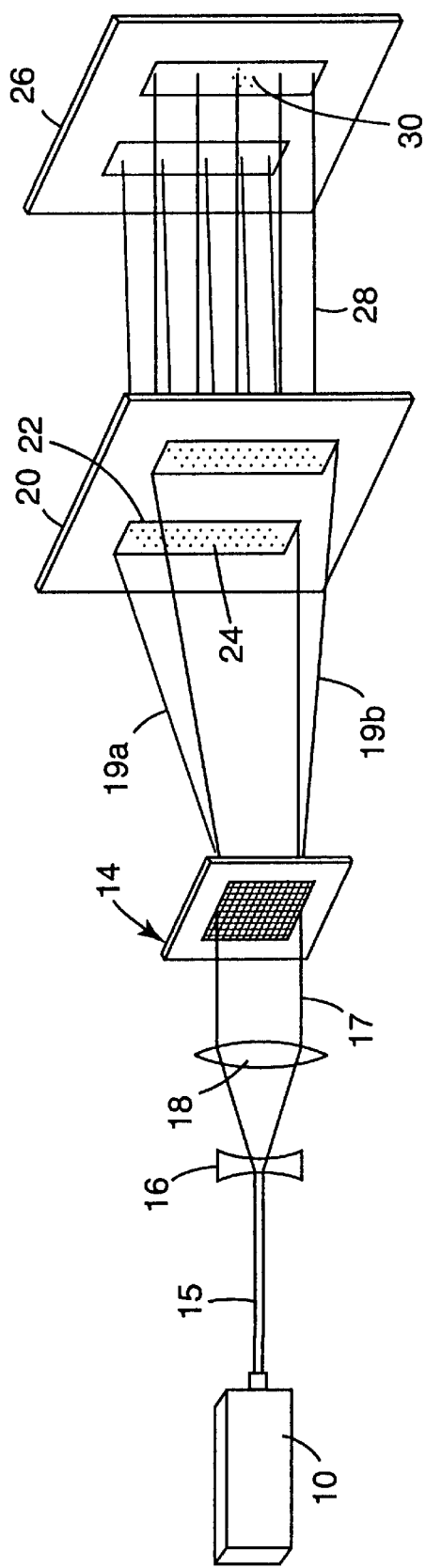
FIG. 3 is a schematic representation of a laser ablation system including a diffractive homogenizer according to the present invention.

FIG. 3 illustrates a simplified apparatus for laser ablation of holes in a workpiece including a diffractive homogenizer according to the present invention. A beam 15 of laser energy is provided by laser 10, which may be an excimer laser. Beam 15 is directed to optical elements 16 that are well known in the art, including collimator 18, which applies a collimated beam 17 to diffractive homogenizer 14. In the illustrated embodiment, diffractive homogenizer 14 creates two homogenized beams 19, each beam creating an illumination field or image 22 on mask 20. Images 22a, 22b have substantially uniform energy intensity over their areas. Substantially all of the laser energy, aside from diffraction efficiency related losses, is directed into images 22 such that there is very little illumination of other areas of the mask 20. The light that is not blocked by mask 20, which passes through holes 24 formed in mask 20, proceeds as masked beams 28 which impinge upon workpiece 26. In the illustrated embodiment, mask beams 28 ablate holes 30 in workpiece 26 at preselected locations as determined by the pattern of holes 24 in mask 20. In the preferred embodiment, each masked beam has substantially equal energy due to the homogeneity of the images created by the diffractive homogenizer 14. Therefore, holes 30 in workpiece 26 are formed at substantially equal rates due to the uniformity of the homogenized beams 19 that impinge upon mask 20.

It will be apparent to one skilled in the art having the benefit of this description that the shape of the illuminated image fields 22 may be any desired shape (subject to physical limitations), and need not be the long narrow fields as are shown in FIG. 1. It is also not required that the images have uniform intensity throughout their areas. It is possible to form images having preselected intensity variations using this invention. Furthermore, the mask is optional in that some applications require merely that a homogenized and properly shaped beam of laser light be applied to a workpiece, without the precise dimensional features provided by the mask. Thus, for applications such as laser annealing of semiconductor components such as inkjet nozzle, the diffractive homogenizer 12 may be designed to form a square or rectangular area directly on the workpiece, without involving a mask.

It should be noted that FIG. 3 is a simplified illustration for the benefit of the reader in understanding the role of the present invention, and it is not intended to be a comprehensive diagram of an ablation apparatus. A typical ablation apparatus will include many additional components, including optical components. In particular, field lenses or other optical elements may be positioned between the diffractive homogenizer and the mask, and a reducing imaging lens may be positioned between the mask and the workpiece, such that the image on the mask may be proportionately larger than the features to be formed on the workpiece.

Figure 4:
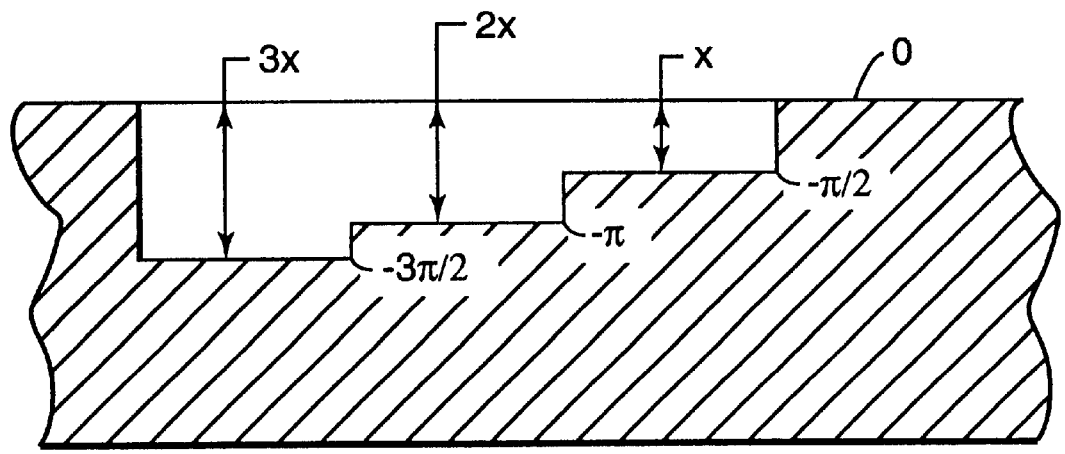
FIG. 4 is a cross-sectional representation of a diffractive homogenizer showing the formation of phase shifting pixels therein.

FIG. 4 is a cross section of an exemplary portion of a diffractive homogenizer according to a preferred embodiment of this invention, showing how the pixels are formed. Each pixel occupies a defined area on the surface of the homogenizer 14. In a preferred embodiment, each pixel occupies a square area that is 2 microns on a side. The pixel phase shift may be quantized such that each pixel provides a phase shift of, for example, either 0 radians, $\pi/2$ radians, $\pi$ radians or $3\pi/2$ radians. As shown in FIG. 4, this is done by etching the fused silica comprising the face of the diffractive homogenizer by either 0, x, 2x, or 3x in depth, where x is the etched depth that provides a phase shift of $\pi/2$ radians for light having a selected wavelength. (One skilled in the art will recognize that by reducing the thickness of the optical plate, the light will travel faster, resulting in phase advancement.) Etching a plate of fused silica to these dimensions at this pixel density is well within the state of the art using semiconductor fabrication etching techniques or semiconductor mask etching techniques. The pixel phase shifts are selected within each sub-element such that the interference pattern created by the light that is transmitted through the sub-element will form the desired illuminated area having a uniform intensity profile across the area. Of course, alternative pixel states may be provided in alternative embodiments of the invention.

Other methods now known or hereafter developed may also be used to create a homogenizer having a phase-shifting pixel array according to this invention. For example, rather than etching pixels in a substrate material, a deposition process may be used to build up material having a known index of refraction in a selected pattern to form a homogenizer. Alternatively, materials having varying indices of refraction may be arranged in a pattern on a substrate to provide the desired pixel arrangement.

By appropriately selecting the phase shift for each pixel, taking into account the interference effects between the various pixels and the spatial coherence of the incident light, the light from a sub-element may be uniformly distributed over an image area having a selected size and shape using the inventive methods described herein.

A person having skill in the art will recognize that, while it is possible to create a pixel pattern within a sub-element that forms a desired image, designing such a pixel pattern is far from being a trivial matter. In accordance with a preferred embodiment of the present invention, several distinct steps are employed to design the pixel pattern, that is, to select which of the four possible states should be chosen for each pixel in the sub-element.

First, an original desired intensity or fluence pattern in the target plane is defined. In FIG. 6, a cross sectional view of an exemplary original desired pattern 600 is shown as a step function indicated by circles at the data points. Within the illuminated area the desired intensity is a constant level, while outside of the illuminated area the desired intensity is zero. Assuming coherent light, a first pixel pattern may be mathematically generated that produces an image that approximates the original desired intensity pattern, using the "coherent inverse model" for creating pixel patterns discussed below in connection with FIG. 5A.

Second, the image generated by the first pixel pattern may be modeled using two models. The first model (the "coherent forward model") assumes that the laser light is fully coherent, and provides the actual image that would be produced by the first pixel pattern in that case, shown as curve 601 in FIG. 6. It is apparent that the intensity rises quickly at the edges of the image, as is desired. The fluctuations of the intensity within the image area are characteristic of using this technique to form a long uniform illuminated area using fully coherent light. The second model (the "partial spatial coherence forward model") takes the partially spatially coherent nature of the laser light into account, as is discussed below in connection with FIG. 5B. This model produces an intensity pattern 602 as shown in FIG. 6 with squares showing the data points. It is apparent that the effect of the partially coherent nature of the laser light is to round off the intensity pattern at the edges of the image, and to generally reduce the intensity within the image. An unacceptable amount of the light energy falls outside of the image boundary as well, and the intensity within the boundary of the image is insufficiently "flat". It is desirable to redirect the light that falls outside of the desired area into the image area, and to use it to raise and improve the uniformity of the intensity pattern within the image.

Third, the difference between the result of the coherent forward model and the result of the partial spatial coherence forward model are compared, and a convolution function ("slit function") is identified that, when applied to the image formed using the coherent forward model, approximately renders the image formed by the partial spatial coherence forward model. See the discussion of FIG. 8, below. This convolution function is then applied inversely to the original desired image, to form a "modified desired image" that, when convolved with the slit function, approximately yields the original desired image. An example of a modified desired image is shown as 710 in FIG. 7 (indicated with circles at the data points).

Figure 7:
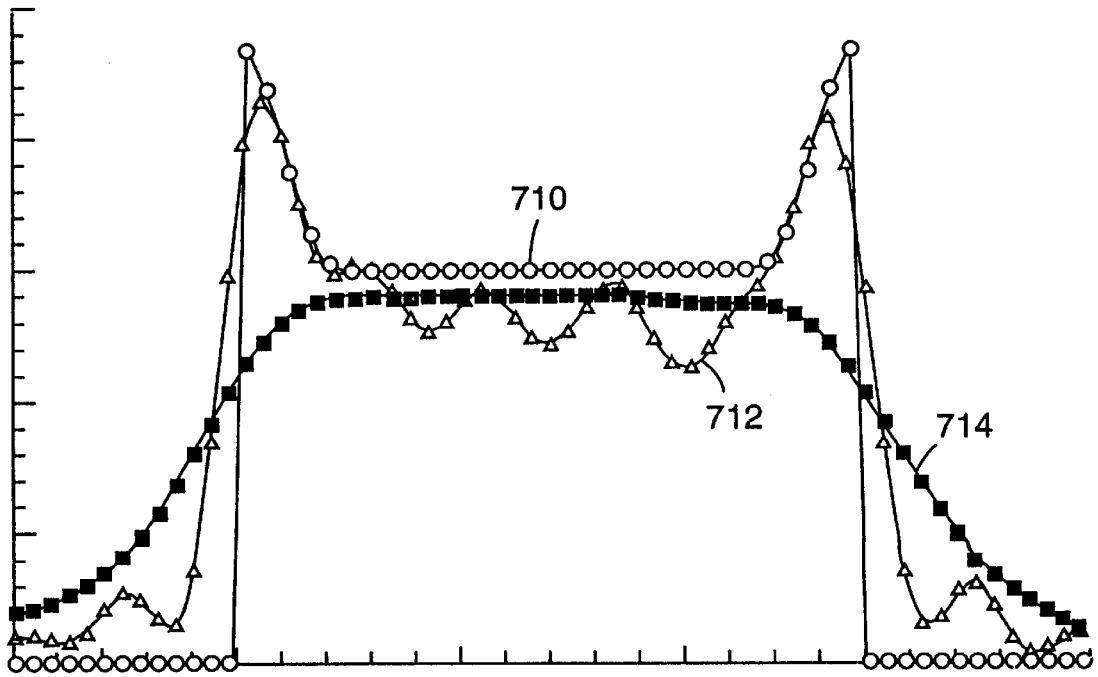
FIG. 7 is a graphical illustration similar to FIG. 6, but with a different desired intensity distribution which has been corrected to compensate for light having limited spatial coherence.

Fourth, the modified desired image is used as an input to the pixel pattern generating system (coherent inverse model), so that a corrected pixel pattern is generated that produces an approximation of the modified desired image (assuming coherent light), shown as plot 712 in FIG. 7 (triangle data points). Because the effects of spatial coherence are taken into account in producing the modified desired image, when the corrected pixel pattern is used with light having limited spatial coherence, an intensity pattern 714 approximating the original desired image is created. Note that cross-section 714 has a broad, flat intensity distribution within the boundary of the image, which is the desired characteristic to be obtained. After the modified desired image is generated, this fourth step may be repeated for each of the sub elements 13 within diffractive homogenizer 14 in order to design the entire device.

Figure 5A:
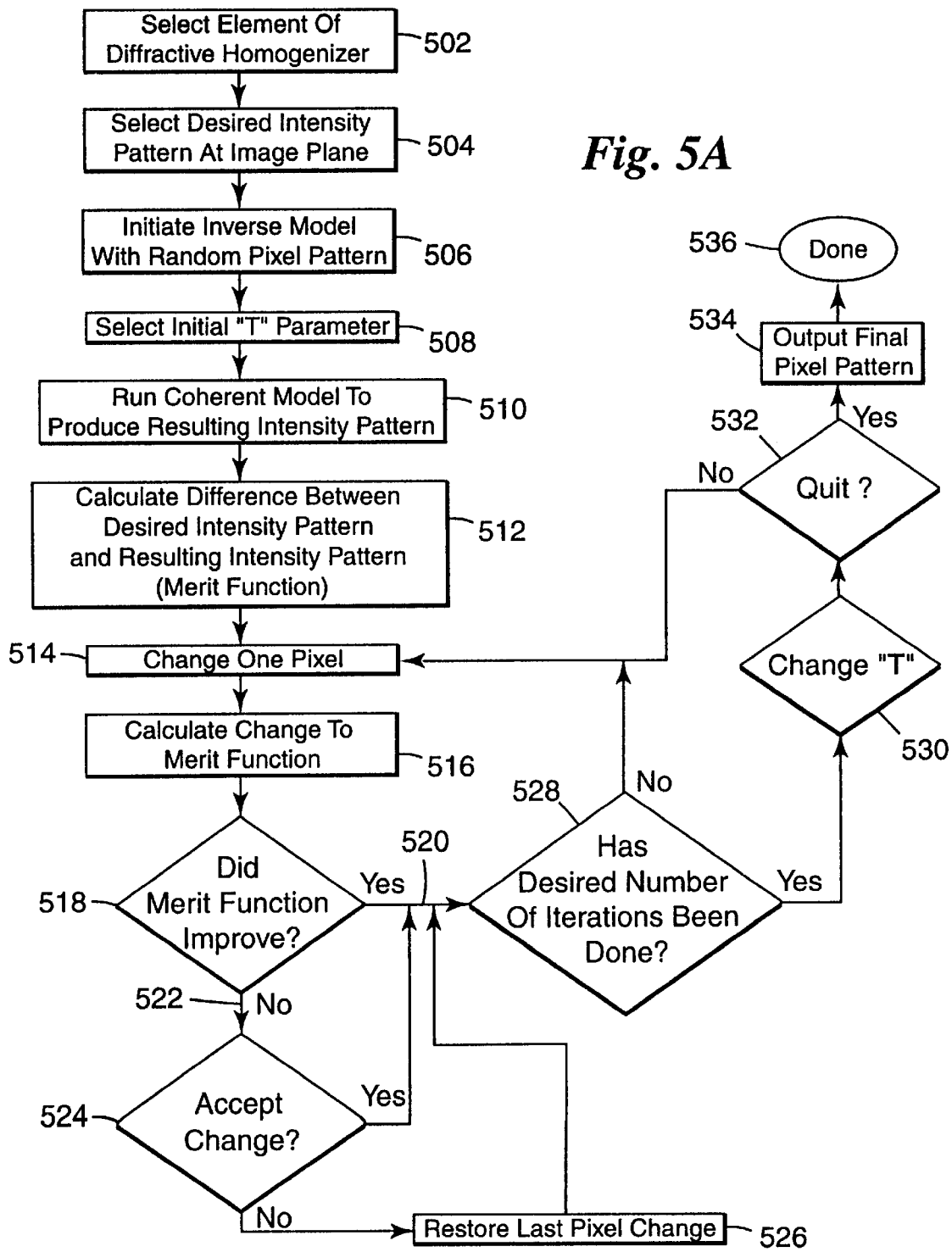
FIG. 5A is a block diagram of the method used to create a pixel pattern for a sub-element of a diffractive homogenizer to produce an image having a desired shape and intensity distribution.
Figure 6:
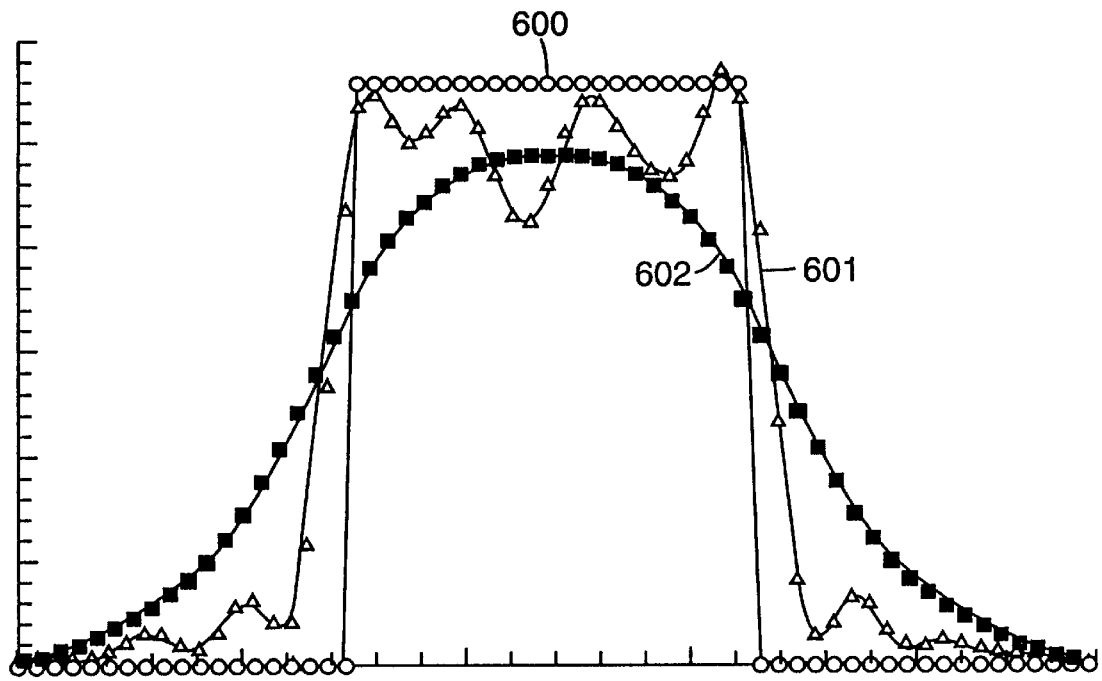
FIG. 6 is a graphical representation of the intensity distribution across a cross-section of an image formed using the present invention, showing the desired intensity distribution, the intensity distribution which would be produced using coherent light, and the intensity distribution which would be produced using light having limited spatial coherence.

FIG. 5A is a block diagram detailing a coherent inverse modeling method that may be employed in preferred embodiments of the invention. An optimization technique such as simulated annealing or a genetic algorithm may be used to create a pixel pattern that will form a desired image. In the presently preferred embodiment, simulated annealing is used. FIG. 5A provides a flowchart of the steps required to generate a pixel pattern for a sub-element using a simulated annealing approach.

First, a sub-element that is to be designed must be identified 502, and the desired fluence or intensity pattern to be generated by the selected sub-element must be defined 504. In the illustrated embodiment, the desired intensity pattern formed by each sub-element is a long, narrow rectangle having a uniform intensity distribution within a specified boundary of the image. Of course, other images may be formed using this invention, including images with non-uniform intensity distributions. As part of steps 502 and 504 the geometry of the problem must be defined, including the distance from the element plane to the target plane and the relative positions of the sub-element and the image within their respective planes.

Next, a computer-model which simulates the interference pattern created by all of the pixels in the selected sub-element is initiated with a random arrangement of pixels (i.e., each pixel is randomly set at one of the four possible states shown in FIG. 4) in the sub-element 506. An initial "temperature" is also selected and used in initiating the computer model 508. This "temperature" is used in the "simulated annealing" algorithms which are known in the art. Regarding simulated annealing, see, for example, W.H. Press et al, 1988, Numerical Recipes in C, Chapter 10.9, "Combinatorial Minimization: Method of Simulated Annealing," (New York: Cambridge University Press 1988). Analogous initialization is also required if a genetic algorithm is employed. Regarding genetic algorithms, see, for example, E. Johnson, et al, "Advantages of Genetic Algorithm Optimization Methods in Diffractive Optic Design," in "Diffractive and Miniaturized Optics," SPIE Optical Engineering Press, S. Lee, ed., 1993.

The coherent model is then run 510 using the initial random arrangement of pixels, and the intensity of the resulting modeled image is calculated for all points in the target plane. This model assumes that the light that is used to create the image is coherent.

In a preferred embodiment, the coherent model that was used involved numerically integrating the equation:

$$\psi(x_p, y_p, z_p) = \frac{\sqrt{I}}{i\lambda f} \sum_{i=1}^{N_{pixel}} e^{i\phi_i} \int\int_{pixel\ i} e^{ikfU(x_p,y_p,z_p,x_i,y_i,z_i)} dx_i dy_i$$

to find the monochromatic scalar wave, $\psi$, at the point $(x_p,y_p,z_p)$, where I is the intensity incident on the diffractive element, $\lambda$ is the wavelength of the incident light, $f=z_p-z_i$ with $z_p>z_i$, and it is assumed that $(z_p-z_i)^2 >> (x_p-x_i)^2 + (y_p-y_i)^2$. $N_{pixel}$ is the number of pixels in the diffractive element. $\phi_i$ is the discrete phase of the pixel, which for most of our designs is 0, $$\frac{\pi}{2},$$

$\pi$ or $$\frac{3\pi}{2}.$$

k is the wavenumber, $$\frac{2\pi}{\lambda},$$

and $$U(x_p, y_p, z_p, x_i, y_i, z_i) \equiv \frac{g}{2}\left(1 - \frac{g}{4}\left(1 - \frac{g}{2}\left(1 - \frac{5g}{8}\right)\right)\right)$$

where $$g \equiv \frac{(x_p - x_i)^2 + (y_p - y_i)^2}{(z_p - z_i)^2}.$$

The integral was computed at all the desired points, $(x_p, y_p, z_p)$ in the image field. The intensity is obtained as the magnitude-square of the scalar field.

The difference between the modeled image and the desired image is then evaluated 512. A "merit function" is defined which quantifies the difference between the desired intensity pattern and the calculated intensity pattern. The merit function provides a numerical result that indicates whether one arrangement of pixels provides a better fit to the desired pattern than does another arrangement of pixels. A merit function may be employed, as a matter of design choice, including absolute difference (L1 norm), least squares (L2 norm), etc. In the preferred embodiment, the merit function may be defined by the equation:

$$M = \sum_{ij} |I_{desired}(x_i, y_i) - I_{modeled}(x_i, y_i)|$$

where $I_{desired}(x_i,y_j)$ is the desired intensity pattern and $I_{modeled}(x_i, y_j)$ is the modeled intensity pattern at the point $x_i, y_j$ in the image field.

After the merit function has been evaluated 512, a random change is made to a randomly selected pixel in the sub-element 514. The coherent model is then used to calculate the resulting change in the merit function 516. This can be done by modeling the intensity pattern generated by the sub-element with the changed pixel, and then evaluating the merit function again. It will be apparent to one skilled in the art that only the effect of the changed pixel needs to be calculated at each point in the image field to calculate the new merit function, because the change is added linearly to the scalar wave integral. The new merit function result is then compared against the prior merit function result, as is indicated by decision block 518.

If the pixel change resulted in an improvement to the merit function (indicating a closer match between the desired image and the modeled image), the pixel change is accepted 520. If decision block 518 determines that the new merit function result is not as good as the prior merit function result indicated by 522, then a decision algorithm 524 is employed to decide whether to accept or reject the last change that was made in the pixel arrangement. If decision block 524 decides to reject the last change in the pixel arrangement, that change is reversed 526. In accordance with the theory of simulated annealing, which is employed in a preferred embodiment of this invention, some pixel changes that result in a poorer merit function result are not rejected. The reason for this is to avoid trapping the pixel pattern in a local minimal, allowing the model to continue searching for a global optimization of the pixel pattern. In accordance with the theory of simulated annealing, the model is initially run at a selected "temperature". The temperature is a parameter that is used in the algorithm represented by decision block 524 to decide whether to accept or reject a pixel change that resulted in a negative change in the merit function. For example, the standard Metropolis algorithm, which is well known in the art, may be used to make this decision.

A counter 528 is employed to control the loop-back of the model to block 514 after the decision whether to accept or reject a pixel change is made. A selected number of iterations are executed at the initial "temperature", the particular number chosen being a matter of design choice. The number of times that the loop is executed should be large comparable to the number of pixels being modeled, for a large number of pixels. In a preferred embodiment, this number was chosen to be about one million for a sub-element having 980,000 pixels. If counter 528 determines that the desired number of iterations has been completed, the "temperature" used in the model is reduced 530, for example by 10 percent, and another set of iterations is run at the lower temperature. This process is repeated over a selected set of decreasing "temperatures". Ultimately, decision block 532 is used to determine that the model has completed execution, for example by determining that the amount of improvement in the merit function caused by the prior change in temperature fell below a predetermined threshold. When the model determines that its execution is completed, the final pixel pattern is provided as an output 534 and the program is exited 536. In executing this model according to a preferred embodiment for designing a single sub-element having approximately one million pixels, the inventor typically utilized about 4 days of processing time on a single-processor Cray J-90 computer.

The pixel design model discussed above in connection with FIG. 5A assumes that the laser light that is used is coherent, which substantially simplifies the calculations that must be made and reduces the time that the model takes to execute. Real laser light is, however, not fully coherent, and the effects of partial spatial coherence may be taken into account to provide an improved image from each sub-element. Referring to FIG. 6, which shows intensity cross sections across the image that is formed by a sub-element, the desired intensity pattern 600 is a step function. The intensity pattern formed by a pixel arrangement designed using the coherent model described above, assuming that coherent light is used to form the image, is shown as 601. (This intensity pattern is generated using the model of block 510 in FIG. 5A.) The intensity pattern formed by the same pixel arrangement, but assuming (realistically) that the laser light has limited spatial coherence, is shown as 602. Note that curve 602 is very rounded, and it does not provide a region of substantially uniform intensity as is required for many industrial applications. Furthermore, a large amount of the laser energy falls outside of the desired image boundary, and it is preferable to direct as much of the laser energy as possible to the region within the boundary of the desired image. Note also that the non-uniform intensity within the image exhibited by the coherent light curve 601 is smoothed out by the finite interference effects of light having partial spatial coherence, which improves the quality of the intensity distribution, if the shape of the partially coherent profile can be improved.

The partially coherent curve 602 is generated by a model that is based on Equation 2–14 from E. Wolf, "A macroscopic theory of interference and diffraction of light from finite sources; Fields with a narrow spectral range," Proc. Roy. Soc., Ser. A, Vol. 225, pp 96–111 (1954), which is solved for each point in the image plane. This model takes partial coherence into account, and the results of this model have been found to be substantially similar to empirical experimental results.

Figure 5B:
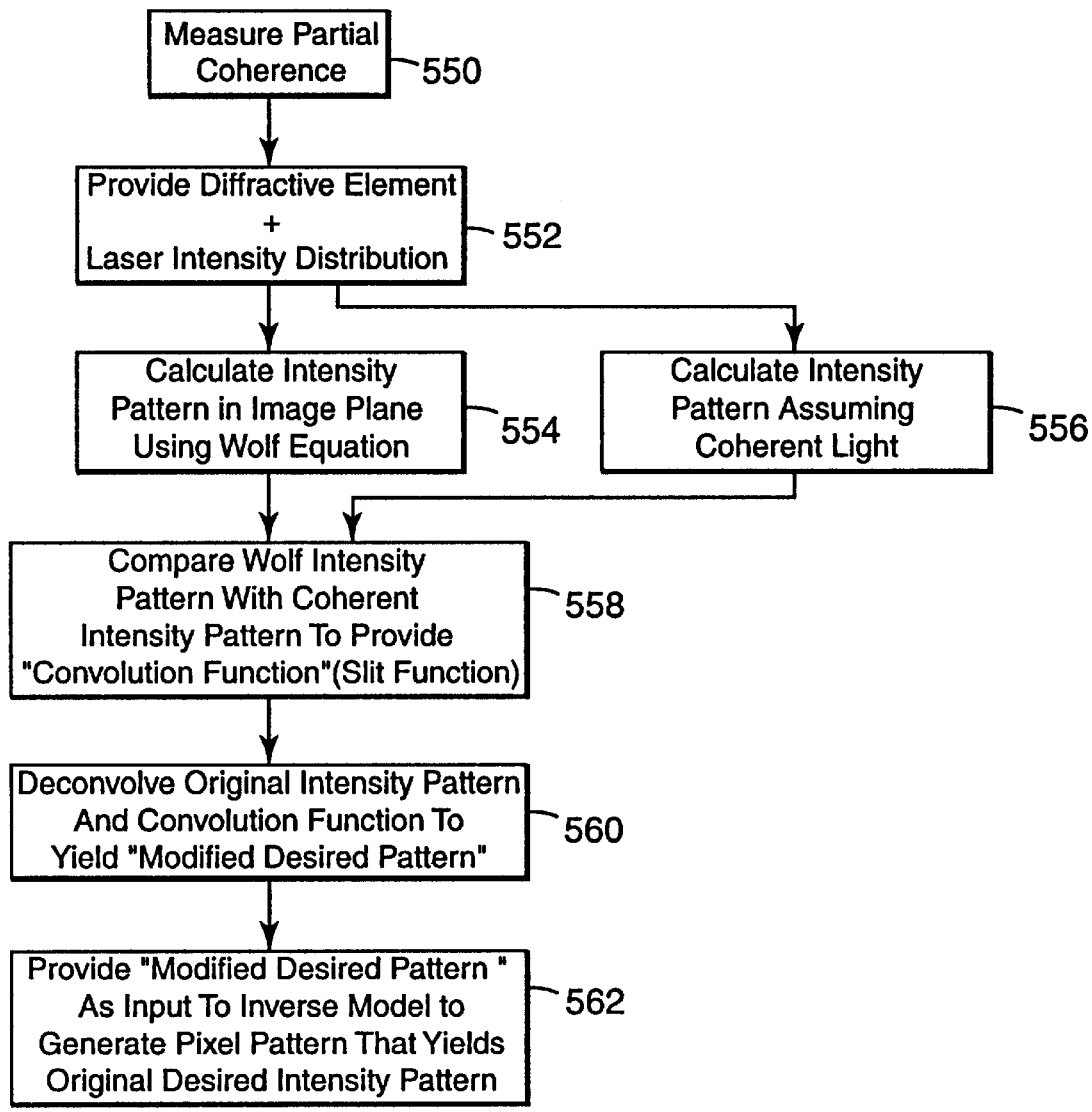
FIG. 5B is a block diagram of a method for modifying the desired image to compensate for the effects of finite spatial coherence in the laser light.

FIG. 5B is a flow chart that shows how the effects of partial coherence may be accounted for in designing a pixel pattern for a sub-element, without having to model the partial spatial coherence in the procedure illustrated in FIG. 5A. First, the partial coherence of the selected light source must be determined 550. The level of coherence of the light source may be determined experimentally, for example by performing a two slit experiment or by use of a shearing interferometer, both of which are well known in the art.

The degree of coherence function may be determined by a two slit experiment, conducted for the light source that is to be used, from the equation:

$$\gamma(\chi_1, \chi_2) = \frac{\sqrt{\frac{I(x_1)}{I(x_2)}} + \sqrt{\frac{I(x_2)}{I(x_1)}}}{2} \left( \frac{I_{max}(|x_1 - x_2|) - I_{min}(|x_1 - x_2|)}{I_{max}(|x_1 - x_2|) + I_{min}(|x_1 - x_2|)} \right),$$

where the two slits are positioned a distance $|\chi_1 - \chi_2|$ from each other, $I_{max}$ is the maximum intensity in the interference pattern of the experiment, and $I_{min}$ is the first minimum intensity next to the maximum intensity. It is assumed that the phase of the degree of coherence function has little relative change over the tested region and so has been dropped from the above equation. The result of such an experiment is a graph of the degree of partial coherence versus distance between slits.

A diffractive element is provided in block 552 that has been designed to produce the desired image, assuming that the laser light is coherent. Such an element may be designed using the method illustrated in FIG. 5A and described above. The intensity distribution provided by the selected diffractive element is then modeled assuming partially coherent light 554 and assuming coherent light 556.

The partially coherent model may implement the Wolf algorithm, as identified above. In a preferred embodiment, the Wolf algorithm was adapted for numerical analysis as follows. The Wolf equation provides the intensity of light at a point p in an image formed from a quasimonochromatic, partially coherent wavefront passing through an array of pixels as follows:

$$I(x_p) = \int_A \int_A \sqrt{I(x_1)I(x_2)} \frac{e^{ik(r_1-r_2)}}{r_1 r_2} e^{i\phi(x_1)} e^{-i\phi(x_2)} \Lambda(x_1, x_p) \Lambda^*(x_2, x_p) \gamma(x_1, x_2) dx_1 dx_2$$

where:

$\chi_p$ is the point at which the intensity is calculated, $\chi_1$ and $\chi_2$ are the points of integration, A is the area of integration for the incident wavefront, $I_i$ is the intensity of light at $\chi_i$, k is the wavenumber, $$r_i \equiv \sqrt{(x_i - x_p)^2 - (y_i - y_p)^2 + (z_i + z_p)^2},$$

Figure 9:
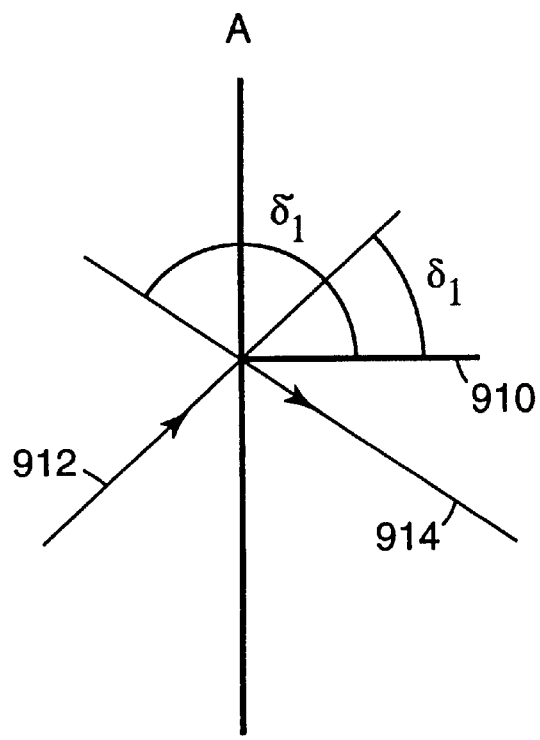
FIG. 9 illustrates the geometrical relationship between $\delta_1$ and $\delta'_1$, which are used in equations modeling the effect of light having limited spatial coherence.

$\phi(\chi_i)$ is the relative phase of the light at $\chi_1$, and $$\Lambda(x_i, x_p) \equiv \frac{i}{2\lambda}(\cos\delta'_i - \cos\delta_i)$$

where $\lambda$ is the wavelength of light and $\delta'_i$ and $\delta_1$ are the angles shown in FIG. 9, and $\gamma(\chi_1, \chi_2)$ is a complex function describing the degree of coherence between the points $\chi_1$ and $\chi_2$. Referring to FIG. 9, plane A is the plane in which the diffractive element is positioned. A reference line 910 normal to plane A is shown. Angle $\delta_1$ is the angle between line 910 and an incident ray 912 from the laser source. Angle $\delta'_1$ is the angle between line 910 and a diffracted ray 914 corresponding to incident ray 912.

For this particular application, one may assume $\delta'_i = \pi$ and $\delta_i = 0$. Thus $$\Lambda = \frac{i}{\lambda}.$$

One may also assume that $r_i \approx R$. Thus, the equation becomes:

$$I(x_p) = \frac{1}{\lambda^2 R^2} \int_A \int_A \sqrt{I_1 I_2}\, e^{i(\phi_1 - \phi_2)} e^{ik(r_1 - r_2)} \gamma_{12} dx_1 dx_2.$$

Discretizing this equation yields:

$$I(x_p) \approx$$

$$\frac{1}{\lambda^2 R^2} \sum_{i=1}^{N} \sqrt{I(x_i)}\, e^{i\phi_i} \int_{pixel\ i} e^{ikr_i} dx_i \sum_{j=1}^{N} \gamma_{ij} \sqrt{I(x_j)}\, e^{-\phi_j} \int_{pixel\ j} e^{ikr_j} dx_j,$$

where N=number of pixels. By making the following definition, $$A_i \equiv \sqrt{I(x_i)} \, e^{i\phi_i} \int_{pixel \ i} e^{ikr_i} dx_i,$$

the discretized equation becomes:

$$I(x_p) \approx \frac{1}{\lambda^2 R^2} \sum_{i=1}^{N_p} \sum_{j=1}^{N_p} A_i \gamma_{ij} A_j^*,$$

where Np is the total number of phase differing pixels encountered by the incident wavefront.

To further simplify, one may assume $\gamma_{ij}$ is a slowly varying function relative to the phase and integrands in the equations above. Therefore, $\gamma_{ij} \approx 1$ when $r_i$ and $r_j$ are less than a certain distance apart. The pixel array may be conceptually divided into a set of super-pixels so that the degree of coherence between the super-pixels may be examined, wherein each super-pixel is a selected group of contiguous pixels. Thus the equation now becomes:

$$I(x_p) \approx \frac{1}{\lambda^2 R^2} \sum_{i=1}^{N_{sp}} \sum_{j=1}^{N_{sp}} B_i \gamma_{ij} B_j^*,$$

where we have defined $N_{sp}$ to be the total number of super-pixels and:

$$B_i \equiv \sum_{j=L_i}^{H_i} A_j,$$

with $L_i$ being the lowest number individual pixel in $B_i$ and $H_i$ being the highest number individual pixel in $B_i$.

The implementation of these equations into a computer model is within the ordinary skill in the art, and it is dependent upon the type of computing system that is to be used for the model; therefore the details of the computer program are not set forth here. The result of these calculations for each point in the target plane is a representation of the intensity distribution assuming partially coherent light, which approximates the actual intensity distribution that would be created by the given pixel pattern in an industrial setting.

The coherent model may use the algorithm from block 510 in FIG. 5A. FIG. 6 shows exemplary cross sections of the desired intensity distribution 600, the coherent intensity distribution 601, and the intensity distribution assuming light having partial spatial coherence. A convolution function or "slit function" may then be derived from these data (block 558) to approximate the relationship between the coherent intensity distribution 601 and the partially coherent intensity distribution 602, such that when the coherent distribution is convolved with the slit function the partially coherent intensity distribution 602 is reproduced to a high degree of approximation.

Next, a modified desired image is formed by deconvolution of the original desired image with the slit function (see 560), such that when the modified desired image is convolved with the slit function, it yields the original desired image. In the illustrated embodiment, the modified desired image is shown as curve 710 in FIG. 7. As can be seen, the effect of this convolution correction for partial coherence is to raise the desired intensity at the edges of the image, to counteract the tendency of the partial coherent response to rise too slowly at the edges of the image. Note that the illustrations of FIGS. 6 and 7 are cross-sections, and that this convolution operation is actually performed on the intensity distribution over a two dimensional image.

FIG. 8 shows a graphical representation of a convolution technique that may be used in this invention, in order to advance the reader's understanding of the technique. FIG. 8A shows a hypothetical desired intensity distribution, which is a step function. FIG. 8B shows the actual intensity distribution that is achieved using a diffractive element designed to provide the desired intensity distribution using coherent light, but when partially coherent light is applied to the element. As can be seen, the effect of partial coherence is to cause a spreading and rounding of the intensity distribution. FIG. 8C shows the convolution or slit function that may be derived to define the relationship between FIG. 8A and FIG. 8B. When the convolution function of FIG. 8A is applied to the desired distribution, the curve of FIG. 8B is generated. FIG. 8D illustrates the modified desired intensity distribution that results from deconvolving (with the constraint that the intensity remain positive) the original desired intensity distribution of FIG. 8A with the convolution function of FIG. 8C. A diffractive element may then be designed, assuming coherent light, using the modified desired intensity distribution as an initial condition. The actual intensity distribution that is produced by such a diffractive element, using partially coherent light, is shown in FIG. 8E. Note the relatively broad, flat region at the top of the curve, which indicates that an area of substantially uniform, high-intensity illumination may be formed by the diffractive element under industrial conditions.

As indicated by block 562, the modified desired image, shown as 710 in FIG. 7, may then be used as the input desired image in the method of FIG. 5A to generate the pixel pattern that is actually used in a sub-element of a diffractive homogenizer in a preferred embodiment of this invention. For each additional sub-element, the desired image is defined, a modified desired image is obtained by deconvolution of the desired image with the slit function described above, and the pixel pattern generation method discussed above in connection with FIG. 5A is used to design the sub-element. Due to the symmetry between certain of the sub-elements and the desired image, it may not be necessary to repeat the full design process for each sub-element. In fact, for a 2-way symmetric image it is only necessary to fully calculate about one-quarter of the sub-elements, and the remainder may be derived by rotating and copying previously designed sub-elements.

In preferred embodiments of the present invention, further corrections may be employed to compensate for the effects of the asymmetry of the laser beam. Excimer lasers typically have a beam profile described as "top-hat/gaussian." The beam is roughly a top hat in the axis between electrodes and gaussian in the other axis. However, this is only the qualitative beam shape. In detail, there is usually also a persistent gradient in intensity between the cathode and anode, and the gaussian axis lacks complete symmetry. The imaging system resolution is directly a function of the numerical aperture of illumination. If the asymmetric beam is properly conditioned by a beam expansion telescope, then the overall size of the beam entering the homogenizer will be roughly the same size, as determined by some small, threshold level intensity. However, the distribution of light in the two axes is quite different. The light coming from the top-hat direction (electrode axis) sends more light in at wide angles at the substrate plane, with the effect of increasing the overall numerical aperture in that direction, and thereby, creating greater imaging resolution. The difference in imaging resolution in the two axes can create difference in process results in these axes, as observed at the substrate. Generally, such differences are not useful in the manufacturing process, and their elimination is desirable.

The difference in intensity of light transmitted by various sub-elements may be controlled by decreasing the intensity of light effectively transmitted by the sub-elements that receive relatively high amounts of energy from the laser. In other words, the intensity of light from sub-elements that are in the "hot-spots" of the laser beam can be attenuated. This may be accomplished by reducing the efficiency of those sub-elements at transmitting light into the desired image by randomizing a selected percentage of the pixels in a sub-element. The randomized pixels operate to scatter a portion of the light that is incident upon the sub-element, and it has been observed that there is a very predictable correspondence between the percentage of randomized pixels and the reduction of intensity in the light transmitted into the illumination field. It has also been observed that randomization of some of the pixels in a sub-element does not adversely effect the quality of the illumination field contribution produced by the sub-element—it merely reduces the intensity of the contribution.

Each laser source that is used in an industrial application has a characteristic beam profile, or a different pattern of brighter and darker areas within a cross section of the beam that it generates. An example is the gradient between cathode and anode discussed above. The beam profile changes slowly over the useful life of a laser source, which may provide on the order of one billion shots in an ablation application. A diffractive homogenizer that employs sub-element intensity correction may be custom designed and manufactured for a specific laser source with which it is to be used. Once a diffractive homogenizer is designed to yield a desired image, as is described elsewhere in this patent, it is possible to alter the transmission efficiency of selected sub-elements of each individual diffractive homogenizer to compensate for the irregularities of an individual laser source.

In a preferred embodiment of the present invention, the sub-element intensity correction is implemented using the following method. First, the laser source is examined to obtain a two-dimensional beam intensity profile. Second, a map of points at the centers of the sub-elements of the diffractive homogenizer is overlaid on the intensity profile, corresponding to the mapping of the beam onto the diffractive homogenizer in the actual ablation system. Third, the intensity profile is divided into a number of concentric circular "bins" around the center point of the diffractive homogenizer. It is sufficient to equalize the intensity within each circular bin, rather than having to equalize the intensity over the entire diffractive homogenizer, because of the circular symmetry of the ablation system. Fourth, within each bin the intensity of the beam at each point is considered, and a decision is made to apply intensity correction in selected amounts to the diffractive homogenizer sub-elements corresponding to the brightest points within the bin. It is not typically desirable to reduce the intensity of all of the points in a bin to that of the darkest point in the bin. Deciding how much intensity correction to apply is a matter of design choice in each application, involving the competing goals of (a) providing as much energy as possible at the workpiece, and (b) providing a uniform amount of energy from each sub-element. Finally, the diffractive homogenizer design (in computer-readable form) may be altered to apply the selected amount of intensity correction to each sub-element.

A sub-element may be altered to apply intensity correction by randomly changing the value of a selected percentage of the pixels in the sub-element. The relationship between the amount of intensity correction required and the number of pixels that must be randomized may be determined empirically or by modeling. Once the relationship is determined in a particular application, it may be used for all sub-elements that need to be corrected. After the initial diffractive homogenizer design is modified with the selected intensity corrections, the computerized design may be used to manufacture a diffractive homogenizer using techniques known in the art. Each diffractive homogenizer that is customized using this method is associated with a particular laser source, and it is installed in the ablation apparatus in the correct orientation at the same time as the corresponding laser source is installed. If a customized diffractive homogenizer is exhausted or damaged before the corresponding laser source is exhausted, it is a relatively simple matter to manufacture an identical diffractive homogenizer from computerized design information, which may be retained for that purpose.

In addition, a well-designed and well-aligned high precision imaging system may still show a systematic and symmetric variation across the field of view of the imaging lens, even if the illumination field is perfectly homogeneous. These variations may arise from chromatic aberrations in the imaging lens, particularly if it is an all quartz lens without chromatic compensation, since the excimer laser is not truly monochromatic. Variations may also arise from aging effects of optics, and other aberrations in the optics. The observed variations in ablated features (e.g. hole diameters) may be very small (of the order of 0.5 microns). To the extent these are caused by inherent properties of the system and remain repeatable, the diffractive homogenizer approach lends itself well to providing a flexible compensation of the ablation process in the illumination field. For example, if a system using this invention is ablating a line of holes across the field of view of the imaging lens, and it shows a characteristic "smile" in exit diameter (large holes near the edges of the FOV), this can be corrected by purposely designing the illumination field to have lower intensity near the edges of the illumination field. Experience has shown these effects to be at the level of 5% or less in intensity. Clearly such control is not available through the use of conventional refractive homogenizers to purposely design a homogenizer for varying an illumination field at a precise level.

Further modifications and alternative embodiments of this invention will be apparent to those skilled in the art in view of this description. Alternative applications for the invention will also be apparent, for this invention may be applied in other fields where homogenization and shaping of radiation beams is useful, including without limitation various annealing processes and nuclear fusion processes. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

I claim:

1. A diffractive homogenizer for producing more than one preselected illumination patterns having a preselected intensity profile within each of the preselected patterns which responds to a beam of substantially monochromatic radiation directed thereon, the diffractive homogenizer comprising:

a plurality of sub-elements, each sub-element contributing a portion of the preselected intensity profile of at least one of the preselected illumination patterns;

wherein each sub-element is comprised of a plurality of pixels, each of said pixels producing a selected phase shift in the radiation;

wherein each sub-element forms a selected contribution, said contribution combining additively to form said preselected illumination pattern;

and wherein said diffractive homogenizer includes at least one of the following compensations;

pixel phase shifts are selected to compensate for the finite spatial coherence of the radiation, said compensation is performed by determining a convolution function that accounts for a difference between an image using coherent light and an image formed using real light having limited spatial coherence, a more uniform distribution of radiation is created within a numerical aperture of illumination by adjusting the selected contribution from each sub-element, or the preselected intensity profile is selected to be non-uniform in order to compensate for one or more repeatable manufacturing process variation.

2. The diffractive homogenizer of claim 1 wherein the preselected illumination patterns include at least one long and narrow illumination field.

3. The diffractive homogenizer of claim 2 wherein the preselected illumination pattern is two long and narrow illumination fields.

4. The diffractive homogenizer of claim 1 wherein the preselected intensity profile is a uniform intensity distribution within about 5%.

5. The diffractive homogenizer of claim 1 wherein the radiation source is an excimer laser.

6. The diffractive homogenizer of claim 2 wherein the narrow illumination field has a narrow dimension and a wide dimension, the compensation for finite spatial coherence of the radiation source being applied to the narrow dimension of the illumination field.

7. The diffractive homogenizer of claim 1 wherein the compensation for manufacturing process variation consists of an illumination field showing a systematic and symmetric variation across the field.

8. The diffractive homogenizer of claim 1 wherein a correction for partial spatial coherence uses a shearing interferometer or two-slit interference to characterize the spatial coherence of the radiation source.

9. The diffractive homogenizer of claim 1 having a design process involving use of global optimization algorithms selected from the group consisting of simulated annealing or genetic algorithms.

10. A multiphase diffractive homogenizer according to claim 1.

11. The diffractive homogenizer of claim 1 wherein the pixel phase is individually selected to be in degrees, said phase selected from the group consisting of $\alpha$ degrees, $\alpha+90$ degrees, $\alpha+180$ degrees, or $\alpha+270$ degrees, where $\alpha$ is an arbitrary angle.

12. The diffractive homogenizer of claim 1 wherein the diffractive homogenizer is made of fused silica.

13. The diffractive homogenizer in claim 1 wherein the uniform distribution of radiation within the numerical aperture of illumination is increased by reducing more intense areas in the distribution by means of random phase selection for a percentage of the pixels, said percentage not to exceed 30%.

14. The diffractive homogenizer of claim 1 wherein the illumination field is used in an imaging system to drill at least one inkjet nozzle.

15. The diffractive homogenizer of claim 1 wherein the illumination field is used for the annealing of at least one semiconductor.

16. The diffractive homogenizer of claim 15 wherein said semiconductor is a thin film transistor.

17. An apparatus for irradiating a target with a selected pattern of radiation, comprising:

a radiation source that forms a radiation beam; and a diffractive homogenizer from claim 1, wherein the illumination field is used directly to process materials, or in conjunction with a mask and imaging system.

18. The apparatus of claim 17 wherein the radiation source is a laser.

19. The apparatus of claim 18 wherein the laser is an excimer laser.

20. The apparatus of claim 17 wherein the diffractive homogenizer is compensated for the finite spatial coherence of the radiation source.

21. The apparatus of claim 17 wherein the diffractive homogenizer is compensated to equalize the distribution within the numerical aperture (or solid angle) of the illumination field.

22. The apparatus of claim 17 wherein the preselected intensity profile produced by the diffractive homogenizer is designed to be non-uniform in such a way as to compensate for at least one repeatable process variation.

* * * * *